Dec. 12, 1933.      P. W. DAVIS      1,938,582
METHOD AND APPARATUS FOR REFINING LEAD
Original Filed Nov. 4, 1930
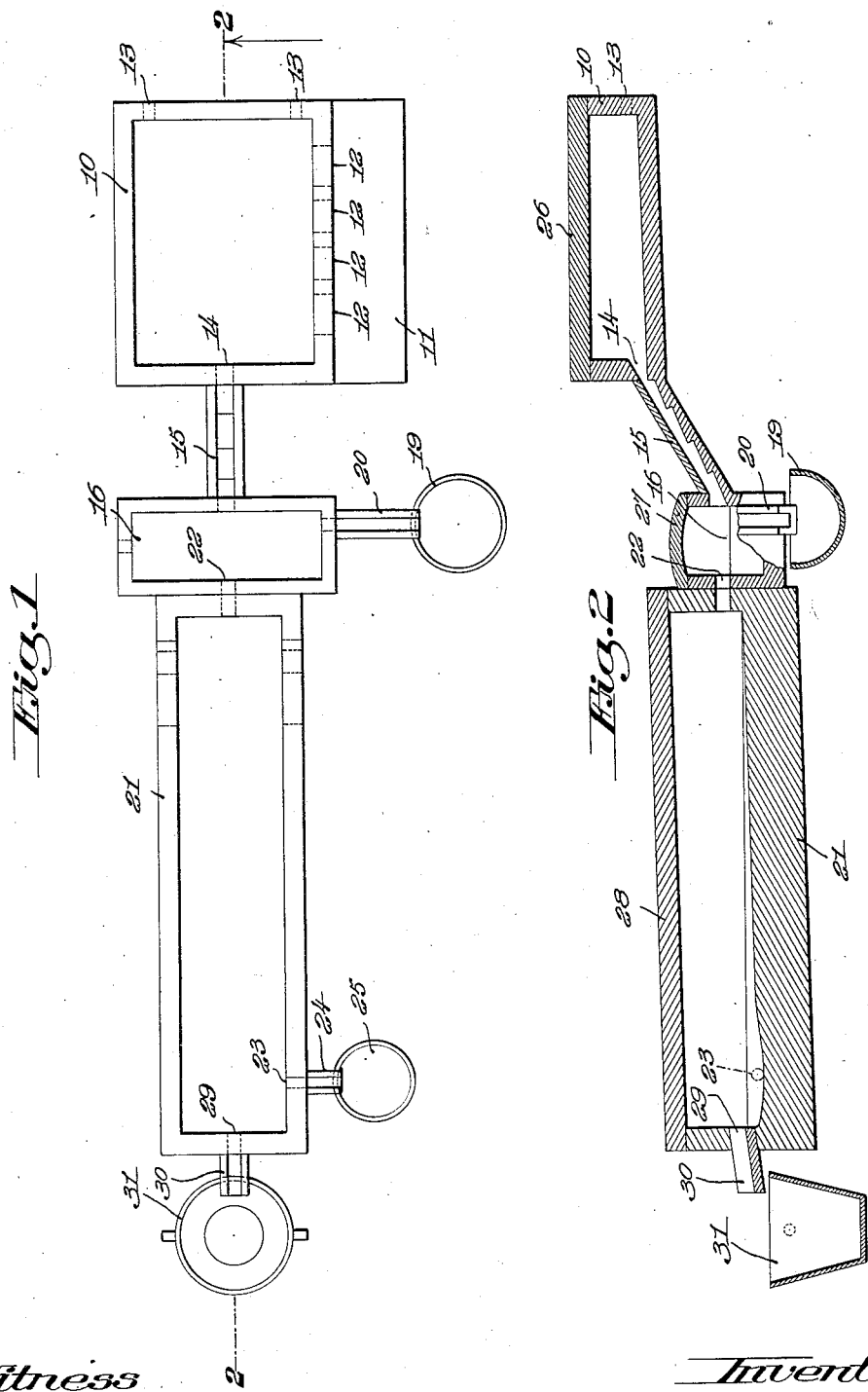

Patented Dec. 12, 1933

1,938,582

UNITED STATES PATENT OFFICE 1,938,582

METHOD AND APPPARATUS FOR REFINING LEAD

Philip W. Davis, Cambridge, Mass.

Application November 4, 1930, Serial No. 493,344
Renewed February 25, 1933

9 Claims. (Cl. 75—15)

The present invention relates to an improvement in method of an apparatus for refining lead.

The object of the invention is to produce a method and apparatus especially adapted for refining lead alloys, and particularly scrap storage battery plates. To this end the invention consists in the method and apparatus hereinafter described and particularly defined in the claims.

In the accompanying drawing illustrating diagrammatically the apparatus, Fig. 1 is a plan with the roofs or tops of the two furnaces and forehearth removed, and Fig. 2 is a sectional elevation of the apparatus of Fig. 1, taken on the line 2—2, Fig. 1.

The illustrated embodiment of the apparatus is described as follows: A melting furnace is indicated at 10. It is provided with a charging platform 11 on one side of the furnace. Charging openings 12 are provided through which the scrap battery plates are shoved from the platform into the furnace. The furnace is heated by oil or gas burners 13 and 13 (or a coke or coal fire), which cause a melting flame to play upon the contents of the furnace. The furnace is lined with a basic material such as magnesite where there is contact between the lining and the charge. The scrap introduced into the furnace falls in a pile presenting an inclined surface to the heating flame, and in the temperature of the furnace the plate grids and plate paste with them melt and the metal lead-antimony alloy of the grids trickles down over and through the litharge formed from the lead and paste, and gives up antimony to the litharge as it passes along over and through the litharge. The operation on the charge begins by the melting of the grid alloy which melts at a lower temperature than the litharge or paste, and the melting of the alloy of the grids frees the litharge which accumulates as a pile of small pieces of litharge on which the molten alloy falls. The refining of the alloy begins with its contact with the unmelted litharge and continues as the alloy trickles down through the mass and enters the molten litharge at the bottom. Here the partially refined alloy gathers in little pools and rivulets on the floor of the melting furnace, and then they flow together with the accumulating molten litharge toward the left hand (Fig. 1) end of the melting furnace toward which the floor is gently inclined, say at an angle of one half inch per foot of length. As the alloy travels toward the lower (left hand) end of the furnace it is undergoing a continuous deprivation of antimony, and is low in antimony content when it reaches the discharge hole 14 through which the thus softened alloy flows out into the stepped chute 15, which delivers the molten materials to the forehearth 16. The molten materials in passing down the chute, run along together, flow from step to step, breaking up into small portions so that the metal and litharge are brought into intimate and extended contact, and this operation further refines or softens the metal as the litharge extracts antimony therefrom. This refining operation is continued during the passage of the molten metal and litharge down the chute and as the stream falls into the forehearth where the molten metal passes through the molten litharge floating on top of the lead contained therein. Any form of chute causing the molten metal and the molten litharge to flow in a turbulent stream from the melting furnace to the forehearth is within the scope of the invention viewed in its broader aspects. The molten materials collect in the forehearth 16, and form a quiet pool in which the metal (soft lead) now freed from its antimony separates by gravity from the oxide containing the antimony which was alloyed with the lead. By means of a trapped or "siphon" tap 20 the soft lead is drawn off into a kettle 19 and the antimonial litharge passes out of the forehearth through a tap 22 above the level of the metal into the reducing or smelting furnace 21 where the next step in the process takes place.

The molten antimonial litharge flows from the forehearth through the chute 22 into the smelting or reducing furnace 21, and spreads over the floor of the furnace which inclines toward the metal tap hole 23. Here it is subjected to a reducing flame in the presence of crushed coke, soft coal or other reducing material. In this furnace 21 the antimonial litharge is gradually reduced to a lead and antimony alloy, and as the melted material flows the length of the floor, the molten lead-antimony alloy or hard lead deposited on the bottom of the furnace gradually makes its way to and through the siphon tap 23 into the chute 24 and thence to the hard lead receptacle 25. From time to time in the operation the coke or other reducing agent is supplied to the smelting furnace through an opening in the side wall or roof or top of the furnace, or it may be supplied continuously, properly proportionate in amount to the entering stream of animonial litharge. The remaining slag flows off from the smelting furnace 21 through the tap 29, chute 30, into the slag kettle 31.

The melting furnace is provided with a roof 26, the forehearth is provided with a roof 27, and the smelting furnace is provided with a roof 28, and a flue for drawing off products of combustion is provided for all three.

The use of this apparatus in the manner described produces soft lead containing as small a quantity of antimony as .003% or less, and is a valuable product for which there is always a lively market. The constitution of the lead-antimony alloy (hard lead) discharged from the smelting furnace will be about 7% to 10% antimony which is a suitable product for use in the manufacture of storage battery plates. Where, however, a higher percentage of antimony is desired, metallic antimony may be introduced into the product in the required amount.

This apparatus may be operated continuously in the production of soft lead and hard lead, that is to say, lead containing so small a quantity of antimony as to be soft lead, and a hard lead containing a desired percentage of antimony for use as battery plates or for other purposes. The operator may, within limits, control the division of the lead into the two products to suit the demands of the market. Thus, when more soft lead is desired than is produced by the softening of the grids in the plates as they come, the output of soft lead may be increased by returning a portion of the hard lead from the smelting furnace to the melting furnace along with the battery plates. The reintroduction of hard lead into the melting furnace may be either as cold pigs or in a small stream or streams of molten alloy.

A storage battery is of limited life, and when worn out finds the junk dealer. The extensive use of storage batteries for automobiles and radio receiving sets has created a substantial flow of worn out storage batteries to the junk dealers, who collect them and sell them to metal refiners. Such worn out storage batteries are ordinarily pulled apart more or less, but the separators, ordinarily wood or some kind of paper between the plates, are not separated from the lead-antimony alloy plates, and in breaking up the batteries pieces of the wooden or rubber boxes in which the batteries are contained are ordinarily found with the junk which the metal refiners buy. The expression "scrap storage battery plates" found in the specification and claims, therefore, is intended to define the ordinary scrap from storage batteries which includes the grids, the paste, ordinarily largely litharge and lead sulphate, and pieces of wood and rubber, and irrespective of the presence or absence of the wood or rubber or other reducing material in the scrap, the process contemplates the use of such scrap. The wood will be burned or have some action as a reducing agent to smelt the plates as they melt, but the expression "scrap storage battery plates" is intended to cover junk storage battery grids and paste, whether any reducing agent be present or not.

Having thus described the invention, what is claimed is:

1. Apparatus for refining scrap battery plates having, in combination, a melting furnace provided with a charging opening, a forehearth, a chute for conveying molten lead and litharge together from the melting furnace to the forehearth, a discharge opening from the forehearth near the bottom for discharging the molten soft lead collecting in the forehearth away from it, and a smelting furnace connected to the forehearth proper by a passage or chute located at the level of the molten litharge in the forehearth, permitting the molten litharge gathering in the forehearth to flow through the charging opening into the smelting furnace above the bottom, said furnace having a discharge opening at or near its bottom at a distance from the charging opening, the discharge opening providing for the discharge of the hard lead produced in the smelting furnace.

2. Apparatus for refining storage battery plates comprising a melting furnace, a forehearth, and a reducing smelting furnace, the melting furnace having a discharge opening and chute conducting the molten materials therefrom to the forehearth, the forehearth having two outlets, one for soft lead and the other for discharging the molten litharge into the smelting furnace, the latter being provided at a point remote from the charging opening with a discharge opening for drawing off the molten hard lead.

3. The apparatus of claim 2 wherein the chute for conducting molten metal from the melting furnace to the forehearth has a stepped bottom to mix intimately the molten metal alloy and litharge in its passage through the chute.

4. The method of refining scrap storage battery plates consisting in subjecting such scrap to a melting temperature, causing the molten material formed from the lead alloy and plate paste to flow in a turbulent stream away from the place of melting to a settling pool, drawing off refined soft lead from the bottom of the pool and subjecting the molten litharge to a flame in the presence of a reducing agent, thereby reducing the antimony bearing litharge to hard metal and slag.

5. The method defined in claim 4 wherein hard lead from the smelting operation is returned to the melting operation.

6. Apparatus for refining storage battery plates comprising a melting furnace, a forehearth having two outlets, one for soft lead and the other for molten litharge, and a chute for conducting molten metal from the melting furnace to the forehearth, the chute having protrusions to cause intimate and extended contact between the metal and litharge in the passage from the melting furnace to the forehearth.

7. Apparatus for refining scrap storage battery plates having, in combination, a melting furnace, a forehearth, a chute for conveying molten metal and oxide from the melting furnace to the forehearth, the forehearth having a discharge opening for withdrawing soft lead, a reducing furnace, and means for conducting molten oxide from the forehearth to the reducing furnace.

8. The method of refining scrap storage battery plates comprising a mixture of lead-antimony alloy and oxide which consists in melting the scrap, the oxide acting to refine the lead by absorbing antimony, drawing off refined soft lead and smelting the antimony bearing oxide with the reducing agent to obtain a hard lead and a slag, and returning hard lead from the smelting operation to the melting operation.

9. The method of refining scrap storage battery plates containing lead antimony alloy and a plate-paste of lead oxide, consisting in subjecting such scrap to a melting temperature, causing the lead-antimony alloy thus melted and molten lead oxide to flow in a turbulent stream down a chute, away from the place of melting, to a settling pool, and separately drawing off soft lead and antimonial oxide from the pool.

PHILIP W. DAVIS.